US012120233B2

(12) United States Patent
Sarin

(10) Patent No.: US 12,120,233 B2
(45) Date of Patent: Oct. 15, 2024

(54) INTERACTIVE TOKEN OF THINGS

(71) Applicant: PayPal, Inc., San Jose, CA (US)

(72) Inventor: Pankaj Sarin, Freemont, CA (US)

(73) Assignee: PayPal, Inc., San Jose, CA (US)

( * ) Notice: Subject to any disclaimer, the term of this patent is extended or adjusted under 35 U.S.C. 154(b) by 312 days.

(21) Appl. No.: 17/643,975

(22) Filed: Dec. 13, 2021

(65) Prior Publication Data

US 2023/0188347 A1    Jun. 15, 2023

(51) Int. Cl.
   *H04L 9/32*        (2006.01)
   *H04L 9/40*        (2022.01)

(52) U.S. Cl.
   CPC ............ *H04L 9/3213* (2013.01); *H04L 63/18* (2013.01)

(58) Field of Classification Search
   CPC ... H04L 9/3213; H04L 9/0891; H04L 9/3297; H04L 63/18; H04L 63/0807
   See application file for complete search history.

(56) References Cited

U.S. PATENT DOCUMENTS

| | | | |
|---|---|---|---|
| 8,689,310 B2 | 4/2014 | Taveau et al. | |
| 10,540,653 B1 | 1/2020 | James et al. | |
| 2012/0144461 A1* | 6/2012 | Rathbun | G06Q 20/4014 726/5 |
| 2012/0151204 A1* | 6/2012 | Jamrog | H04L 63/0815 713/150 |
| 2017/0140385 A1* | 5/2017 | Dobson | G06Q 20/4016 |
| 2018/0005227 A1* | 1/2018 | Sandeløv | G06Q 20/20 |
| 2019/0080405 A1 | 3/2019 | Molinari et al. | |
| 2019/0130391 A1 | 5/2019 | Wright et al. | |
| 2019/0199793 A1* | 6/2019 | Sarin | H04L 63/126 |
| 2020/0053080 A1* | 2/2020 | Hamlin | H04W 12/06 |
| 2020/0364711 A1* | 11/2020 | Sarin | G06Q 20/3672 |

* cited by examiner

*Primary Examiner* — Robert B Leung
(74) *Attorney, Agent, or Firm* — Kowert, Hood, Munyon, Rankin & Goetzel, P.C.; Scott W. Pape; Dean M. Munyon

(57) ABSTRACT

Disclosed methods include receiving, by a system, a request from a computing device for an information exchange between a first entity and a second entity, and then generating a first token request for a cryptographic token to be authorized to enable the exchange. In response to receiving an indication that authorization was declined, the system may cause the computing device to identify a different cryptographic token of a connected application. The different cryptographic token may be usable by the connected application to authenticate the first entity to a computer service associated with the connected application. The system may communicate with the computer service to approve use of the different cryptographic token by the system, and then generate a second token request for a substitute cryptographic token using information from the different cryptographic token. The system may complete, using the substitute cryptographic token, the exchange between the first and entities.

20 Claims, 9 Drawing Sheets

INTERACTIVE TOKEN OF THINGS

BACKGROUND

Technical Field

This disclosure relates generally to computer system security, and more particularly to techniques for authenticating a user.

Description of the Related Art

Cryptographic tokens are commonly used for a variety of security tasks, such as granting access to a particular user account on a web service, authorizing various types of exchanges, and authenticating a particular individual among a plurality of users. For example, a cryptographic token may be used by an online navigation service to maintain a list of various locations of interest to a particular user. Cryptographic tokens may be used by a media streaming service to authorize a particular user's rights to access a given media file. Online conferencing services may utilize cryptographic tokens to identify whether a particular user has rights to attend a given meeting.

Declining a customer's request to access desired content or execute a particular information exchange may lead to customer distress, which in turn, may lead to lost time, revenue, and/or customer satisfaction to service complaints or even enter into litigation to resolve the issues associated with the declining. Requests may be declined due to variety of reasons, including for example, an insufficient balance/credit in an account of the requestor, and determination of an unacceptable risk that the requestor is unauthorized to perform the request. In some cases, a request may be declined for a non-risk/insufficient balance reason. For example, communications issues between a computing device initiating a request and a processing system authorizing the request may prevent an authorization from being completed. Authorization of such requests may include an exchange of information between a requesting device and a processing device. Inadequate communication channels between the two devices may delay portions of the information exchange, resulting in a timeout occurring in the authorization process. Such a timeout may result in a rejection of the request. Techniques for overcoming such non-risk-based rejections may be desired.

DETAILED DESCRIPTION

Figure 1:
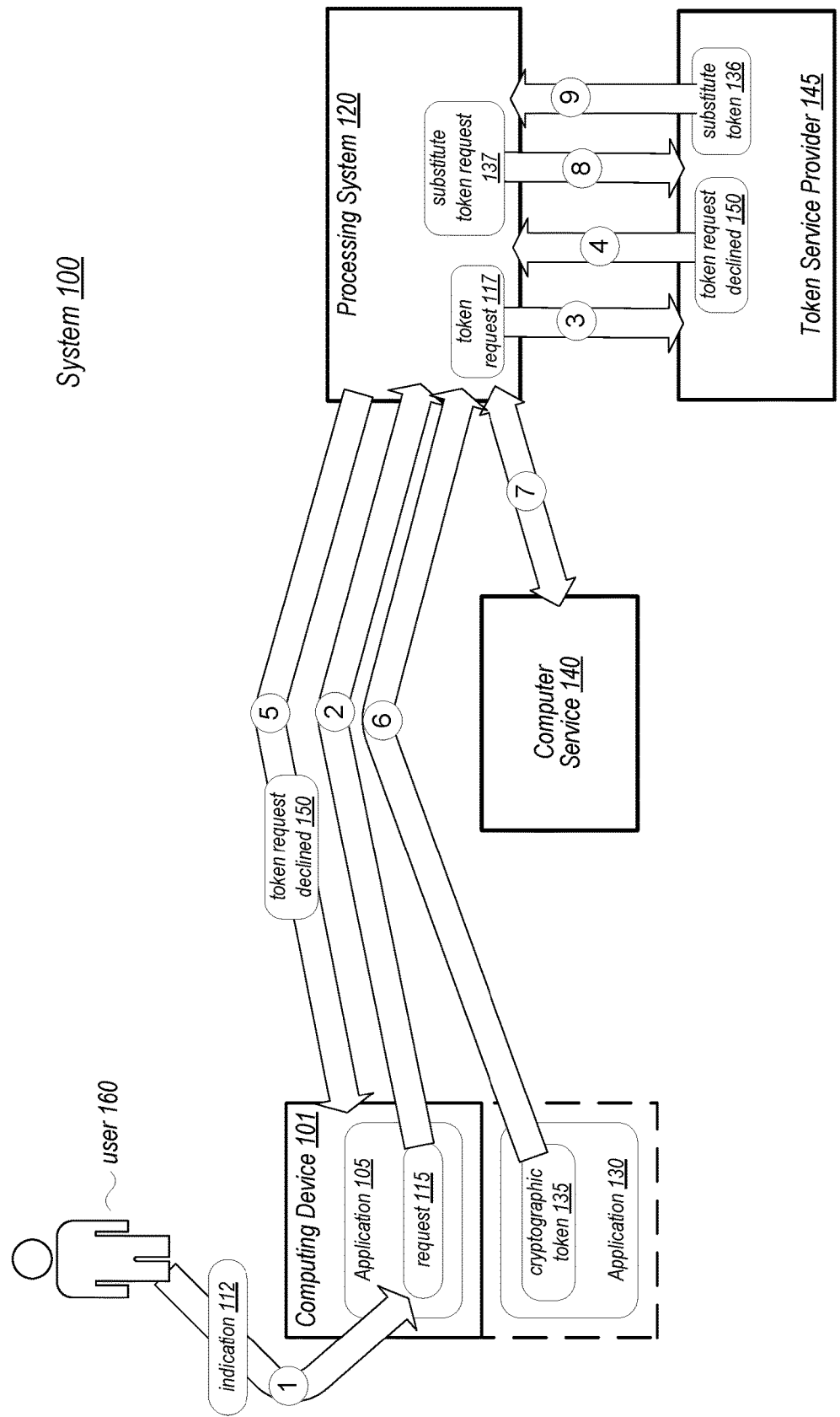
FIG. 1 is a block diagram illustrating a process flow of an embodiment of a system for authorizing a request.

A request to perform an information exchange may include requesting of a cryptographic token to be used as an indication of the requestor's identity and agreement to fulfill their part of the requested information exchange. As used herein, an "information exchange" is a computer operation that includes updating information in a computer system along with related work, i.e., a transaction. In many cases, these transactions are considered to be indivisible, and succeed or fail as a complete unit. In many cases, an information exchange involves two entities. For example, a first entity (a user) may request that a second entity (a server) update the user's record in a database. Similarly, a first entity (a first user of a service) may request an information exchange with a second entity (a second user of the service) that results in information being exchanged between the entities or within the service. An information exchange may, in some cases, also result in the exchange or physical or electronic goods/services.

The cryptographic token may be issued by a token processing system and then authorized by a processing system before it is valid for use with the request. Authorization of a cryptographic token may be declined due to variety of reasons, such as determination of an unacceptable risk associated with the requestor fulfilling their part of the information exchange. For example, the requestor may have been part of a prior information exchange that was later determined to be fraudulent, or that was not completed due to actions of the requestor. In other cases, authorization of a cryptographic token may be declined for non-risk reasons, such as communications issues between a computing device initiating the token and a processing system authorizing the token, or the requestor may be slow to respond to a prompt, resulting in the authorization failing to be completed within an allowable amount of time.

The present disclosure recognizes that if authorization of a cryptographic token is declined for non-risk reasons (e.g., a timeout occurs before the authorization process completes), an alternative cryptographic token may be available for use. For example, an application that generates the declined token may request to repurpose an existing token from another secondary device or application which may be online in the vicinity (e.g., a navigation application is active on a nearby smartphone, tablet computer, or connected car) that is associated with the requestor. This existing token for the navigation application may be session token used to authenticate a user to a server computer providing the navigation service. A session token may be considered a non-exchange token, and therefore, it may not include exchange specific information. The requesting application may select the session token for conversion to an exchange token, including addition of information related to the information exchange. The application's token request may treat the navigation application as a child exchange processor with the requesting application as the parent processor. Terms and conditions for repurposing the existing session token may be imposed by an entity associated with the navigation application if the information exchange request is completed using the entity's cryptographic token.

If authorization of a cryptographic token is declined because a non-risk criterion (e.g., a communication timeout) is not met, then an associated information exchange may fail to be completed. By repurposing a different token from a different application, additional information may be provided that may be used in the risk assessment of the original request such that failure to satisfy the non-risk criterion is acceptable. If the request is going to be declined due to an issue with an initial communication path of the payment token, the different token may provide an alternative communication route for transmitting a substitute cryptographic token via the entity associated with the different token. Such use of the different cryptographic token to generate a substitute cryptographic token may improve efficiency for completing information exchanges, thereby increasing bandwidth of the associated processing systems by reducing a number of repeated attempts to complete a request.

Disclosed embodiments include a technique in which a particular application executing on a computing device receives a request from a user for an information exchange. The particular application may send the request, including a cryptographic token, to a processing system for authenticating the user. In response to receiving an indication that the request was declined, the particular application may identify a different cryptographic token (usable to authenticate the user) of a connected application detectable by the particular application. The particular application may generate a substitute cryptographic token using information from the different cryptographic token, and then send, to the processing system, a further request that includes the substitute cryptographic token. The substitute cryptographic token may then be used by the processing system to complete the information exchange.

A block diagram of an embodiment of a system that may be used to implement the disclosed techniques is illustrated in FIG. 1. As illustrated, system 100 depicts an example of a request for an information exchange being declined, and in response, a substitute cryptographic token being generated using information from a different cryptographic token. System 100 includes computing device 101, processing system 120, computer service 140, and token service provider 145. User 160 provides indication 112 to application 105 on computing device 101. Application 130 and associated cryptographic token 135 may be implemented on computing device 101 or on a different device communicatively coupled to computing device 101.

As illustrated, user 160 provides indication 112 to application 105, executing on computing device 101, indicating the user's desire to perform an information exchange, as indicated by sequence number 1. The information exchange may, for example, be a request to stream particular media content, purchase goods or services, log into an online account, and the like. Computing device 101 may be any suitable type of personal computer, including, e.g., a laptop computer, a tablet computer, a smart phone, and the like. Application 105 may be a part of an online service being accessed by user 160, e.g., a media player for streaming media or an application for an online merchant, or may be a third-party application such as a web browser or a payment processing application. User 160 may directly interface with application 105 to generate indication 112 or may initiate indication 112 on a different device that then causes indication 112 to be provided to application 105.

In response to indication 112, application 105 creates and sends request 115 to processing system 120, as indicated by sequence number 2. In some embodiments, computing device 101 sends request 115 first to a local terminal (not shown), which then relays request 115 to processing system 120. As shown, however, computing device 101 communicates directly with processing system 120. In some embodiments, processing system 120 may be a computer system of a web service provider, e.g., a streaming media service. In other embodiments, processing system 120 may be a computer system included in a third-party processing system that authenticates user 160 and approves information exchanges between user 160 and other entities, such as a service station or streaming media service.

As shown, processing system 120 receives request 115 from computing device 101 for an information exchange between user 160 and a second entity. Processing system 120 generates token request 117 for a cryptographic token that is to be authorized to enable the information exchange, and sends token request 117 to token service provider 145, as indicated by sequence number 3. Token request 117, as illustrated, includes information for authenticating user 160. Token service provider 145 is an online service that is trusted by subscribing entities to generate cryptographic tokens in response to successful authentication of one or more parties involved in an information exchange. In some embodiments, token service provider 145 and processing system 120 may be a same entity. Processing system 120 may be configured to use the requested cryptographic token to indicate a successful authentication of user 160 and approval of the information exchange. Processing system 120 may then provide the requested cryptographic token to one or more entities associated with completing the information exchange.

In some embodiments, communication may be needed back and forth between processing system 120 and computing device 101 in order to complete the authentication of the user. For example, processing system 120 may not generate token request 117 until at least a preliminary authentication of user 160 has been successfully completed. In addition, processing system 120 and/or token service provider 145 may limit an amount of time to receive responses from computing device 101 during this authentication process. Failure to respond within the time limit may result in a timeout occurring and subsequently result in processing system 120 declining request 115 and not generating token request 117. In other cases, token service provider 145 may decline token request 117 if authentication information from user 160 is not received within established time limits. Failure to meet these time limits may occur due to quality and/or bandwidth of network connections linking computing device101, processing system 120, and token service provider 145. In some cases, computing device101 may include networking circuits that are one or more generations old and, therefore, may not be capable of communicating at speeds expected by processing system 120. In other cases, user 160 may be slow to respond to a prompt displayed by application 105 on computing device101 as part of the authentication process. Declination of request 115 or token request 117 for communication issues such as these may be considered "non-risk criteria" as used herein.

In other cases, request 115 or token request 117 may be declined due to risk-related criteria. As used herein, "risk-related criteria" include criterion that are indicative of a user being at risk of not fulfilling their portion of a given information exchange, or of a user not representing their identity honestly. Risk-related criterion may include, for example, a history of the user failing to complete information exchanges that were completed on credit, or a user that has made an excessive number of fraud claims with a processing service that includes processing system 120.

Risk-related criterion may further include information associated with a requestor not being consistent with a registered user associated with a particular user account from which a request is made. For example, a current geo-location of user 160 may be inconsistent with previous locations associated with user 160. Processing system 120 may consider any risk-related criteria associated with request 115 and generate a risk score. If this risk score does not satisfy a threshold risk score, then request 115 may be declined, and token request 117 never generated.

In response to receiving token request declined indication 150 that authorization of the cryptographic token was declined (sequence number 4), processing system 120 is configured to cause computing device101 to identify cryptographic token 135 of application 130 that is detectable by application 105 (sequence number 5). In some embodiments, token request declined indication 150 includes an indication that a reason for declining is related to a non-risk criterion. Otherwise, in response to token request declined indication 150 indicating that request 115 is declined for a risk-related criterion, application 105 may display a notice of the declined request on a display of computing device101, and may cease further activity related to request 115. If the reason for the declination of request 115 is due to one or more non-risk criterion, then application 105, as shown, looks for a different application that is currently connect to a web service. Application 105 may identify application 130 running on either computing device101 or on a different device associated with user 160 and communicatively coupled (e.g., via Bluetooth®, Wi-Fi®, or the like).

As shown, cryptographic token 135 is usable by application 130 to authenticate user 160 to computer service 140 associated with application 130. A "connected application," as used herein, refers to an application that uses cryptographic tokens as an indication of a successful authentication with an online computer service to which the application is connected. Cryptographic tokens used by such applications to keep a user connected to an online computer service are referred to herein as "session tokens." A session token, such as cryptographic token 135, may be recognized by token service provider 145 as valid for maintaining an open session between user 160 and computer service 140. Token service provider 145, however, may not recognize cryptographic token 135 as valid for the information exchange associated with request 115.

Examples of connected applications may include, for example, navigation applications that store information such as particular destinations and or preferences for user 160, social media applications, messaging applications, and the like. Use of cryptographic session tokens may allow application 130 to be paused or exited, and then resumed without having to perform a subsequent authentication, but still providing an acceptable level of security to prevent unauthorized use of computer service 140. Accordingly, cryptographic token 135 provides an indication of an identity of user 160.

Using information from cryptographic token 135, application 105, as illustrated, provides processing system 120 with information regarding cryptographic token 135 (as indicated by sequence number 6). Since cryptographic token 135 provides a valid authentication of the identity of user 160, processing system 120 may utilize this valid authentication to generate substitute cryptographic token request 137. Cryptographic token 135 may include a cryptographic key that is accessible to processing system 120, and from which processing system 120 and/or token service provider 145 may be capable of confirming an identity of user 160.

As illustrated, processing system 120 communicates with computer service 140 to approve use of cryptographic token 135 by processing system 120 (sequence number 7). This communication may include establishing one or more criteria for using cryptographic token 135 to complete request 115. Use of cryptographic token 135 may approved without input from user 160. Accordingly, non-risk criteria that may have contributed to the declination of request 115 may be avoided.

Processing system 120, as shown, generates substitute cryptographic token request 137 that includes information from cryptographic token 135, and sends substitute cryptographic token request 137 to token service provider 145 (sequence number 8). As described above, cryptographic token 135 may not be valid for use by processing system 120 to complete request 115. Accordingly, processing system 120 generates substitute cryptographic token request 137 that requests token service provider 145 to issue substitute cryptographic token 136 using the information from cryptographic token 135. The information from cryptographic token 135 provides a currently valid authentication of user 160, thereby avoiding a need to perform a new authentication of user 160 specific to request 115.

Token service provider 145 may, in turn, respond with substitute cryptographic token 136 (sequence number 9). Substitute cryptographic token 136 is usable by processing system 120 to authenticate user 160, and processing system 120 may, therefore, use substitute cryptographic token 136 to complete the originally requested information exchange. In some embodiments, to avoid communication issues that may have resulted in the declination of request 115, computer service 140, rather than processing system 120, may generate and send substitute cryptographic token request 137 to token service provider 145 to generate substitute cryptographic token 136. After receiving substitute cryptographic token 136, computer service 140 may send substitute cryptographic token 136 to processing system 120, or computer service 140 may use substitute cryptographic token 136 to complete the requested information exchange.

By identifying and converting a cryptographic session token in response to a determination that request for an information exchange has been declined, the requested information exchange may be completed rather than being discarded and restarted. Use of a cryptographic session token may provide a similar level of security for a substitute cryptographic token as an original exchange token, and may avoid issues that contributed to the decline of the original request. Completing the information exchange with the substitute cryptographic token may reduce a workload placed on the processing system, thereby freeing bandwidth for other information exchanges to take place.

It is noted that the embodiment of FIG. 1 is merely an example. Features of the system have been simplified for clarity. In other embodiments, additional elements may be included, such as networking circuits to couple computing device101, processing system 120, token service provider 145, and computer service 140. In addition, in some embodiments, application 130 and associated cryptographic token 135 may be on a second computing device of user 160.

Figure 3:
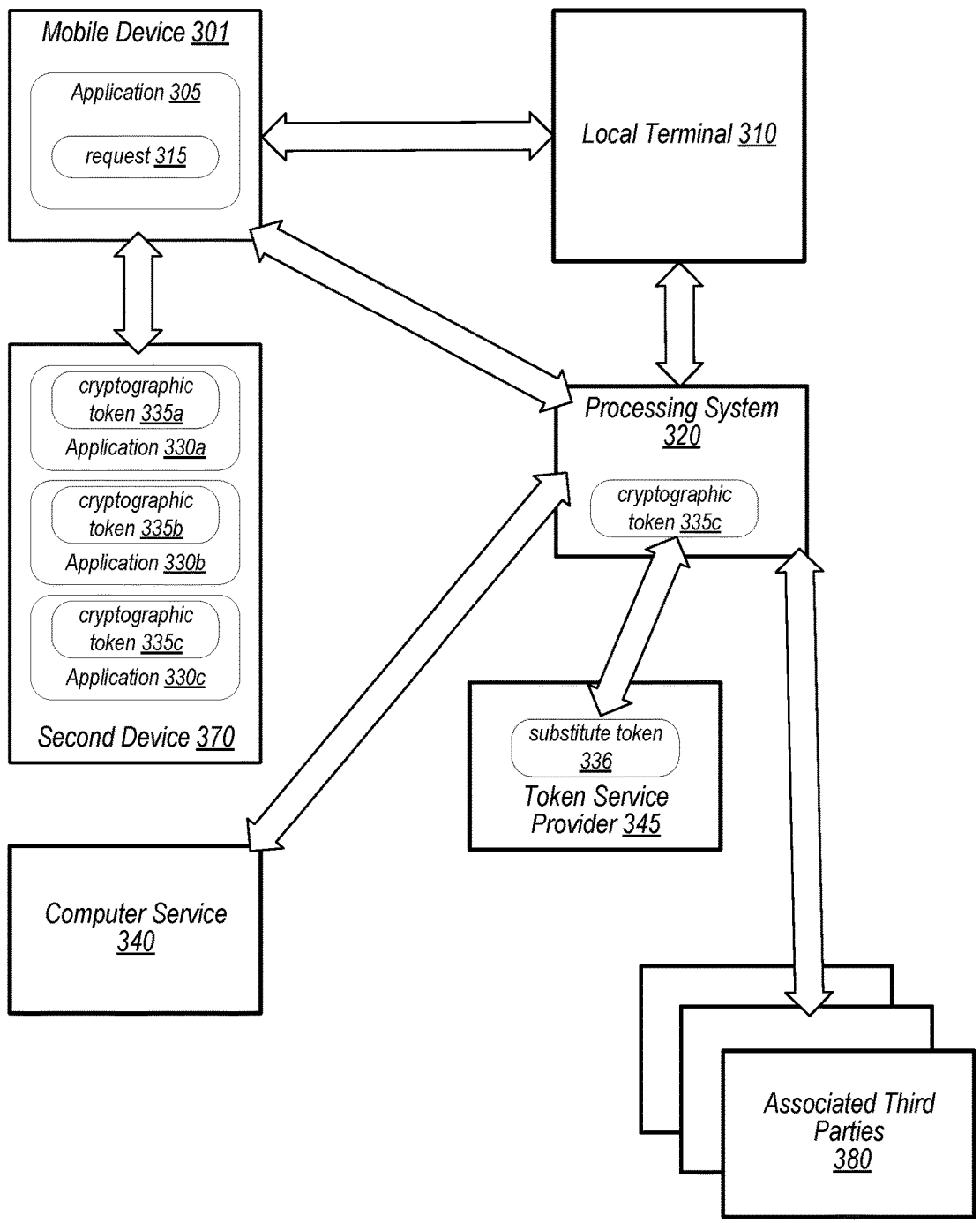
FIG. 3 depicts a block diagram of an embodiment of a system for authorizing a request using a mobile device and a second device.
Figure 4:
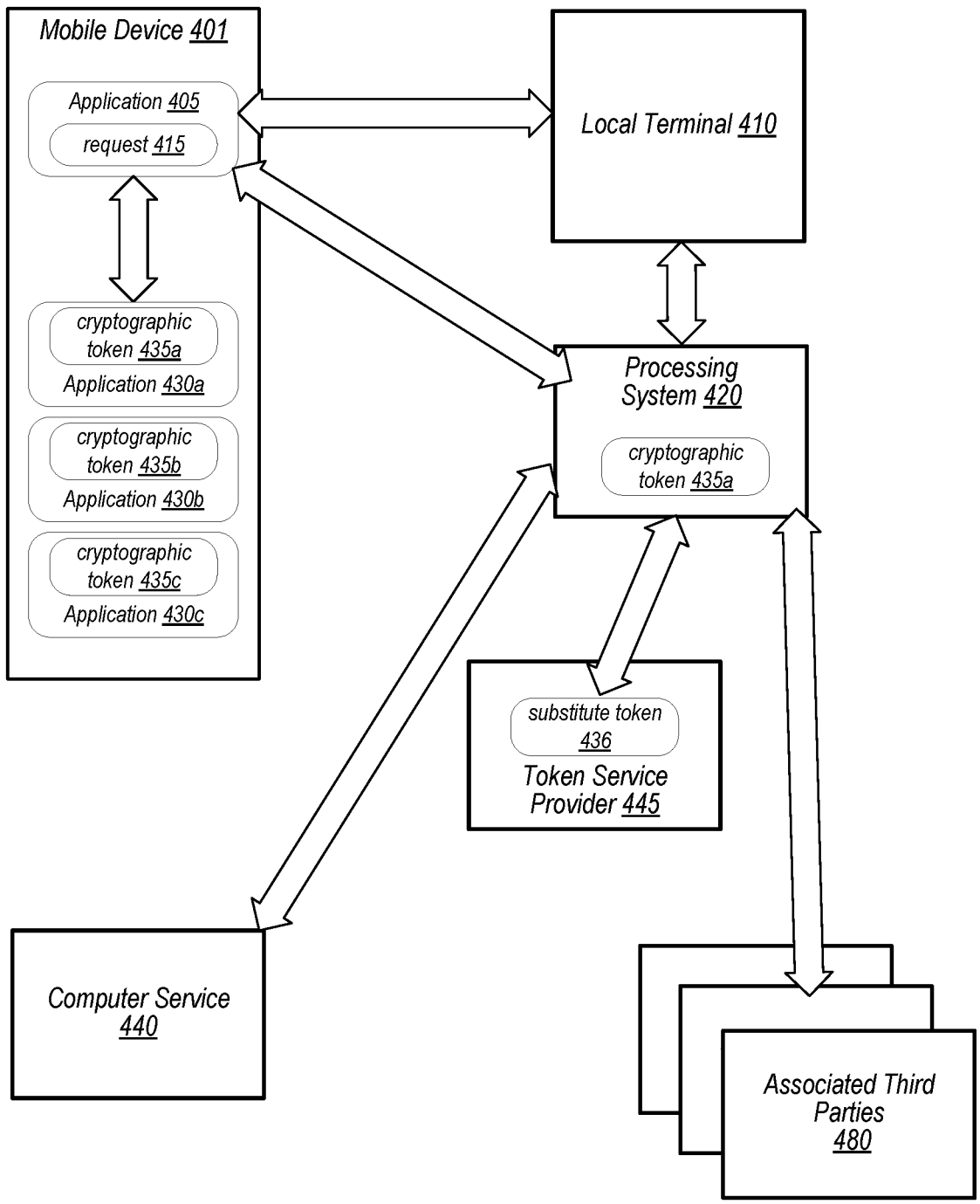
FIG. 4 illustrates a block diagram of an embodiment of a system for authorizing a request using multiple applications on a mobile device.

As disclosed in FIG. 1, a technique is described for identifying and using, by a first application, a cryptographic token generated for a different application to complete an information exchange request. Such a technique may be applied to various embodiments. Three embodiments are illustrated in FIGS. 2-4.

Figure 2:
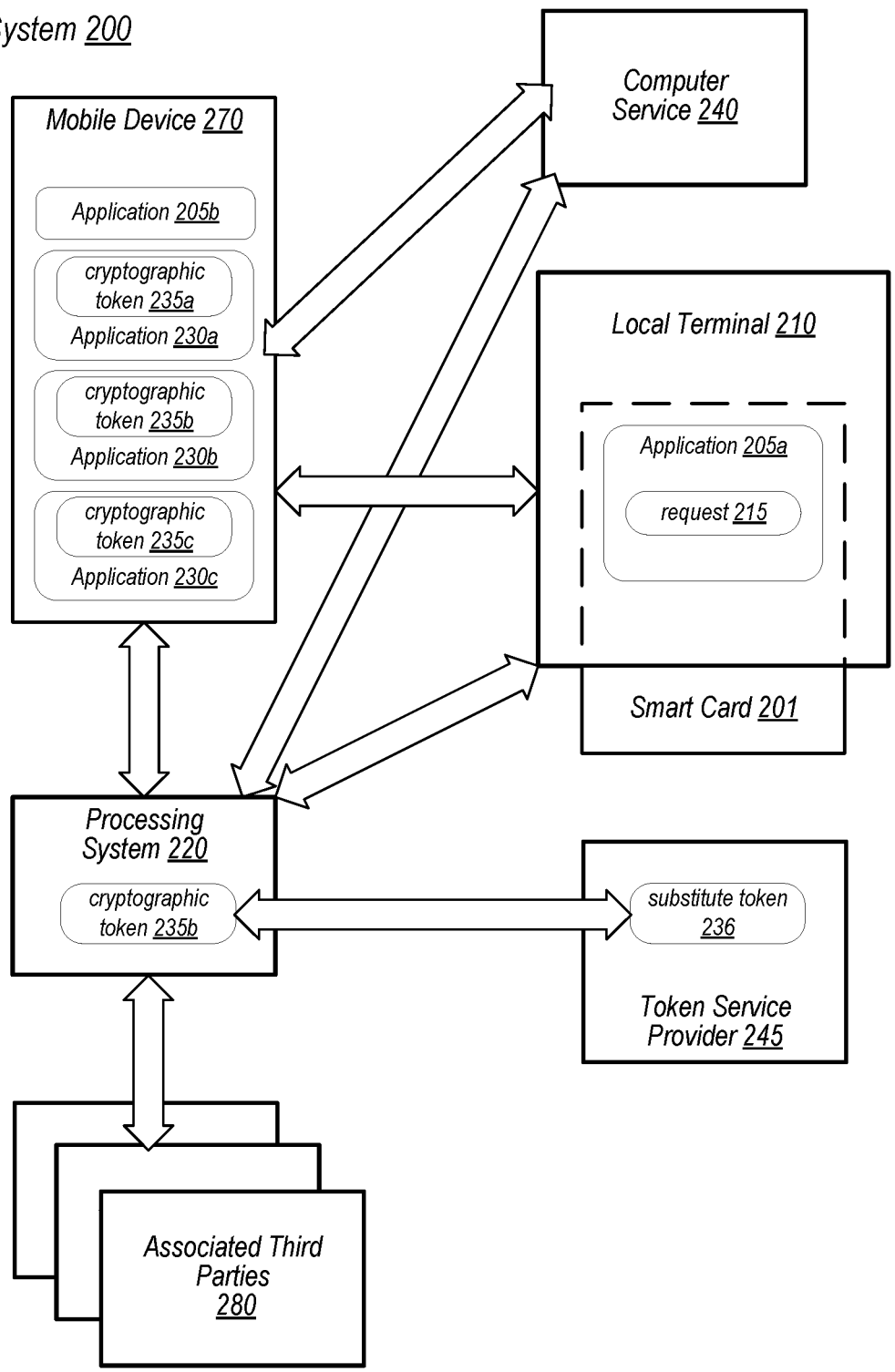
FIG. 2 shows a block diagram of an embodiment of a system for authorizing a request using a smart card and a mobile device.

Moving to FIG. 2, a block diagram of an embodiment of a system that implements the disclosed techniques is illustrated. System 200 includes local terminal 210, processing system 220, computer service 240, token service provider 245, mobile device 270, and associated third parties 280. Smart card 201 is inserted into, or otherwise coupled to local terminal 210, thereby activating application 205. Applications 230a-230c (collectively applications 230) are running on mobile device 270.

As illustrated, a computing device running application 205 receives, from a user, an indication of a request for authentication of an information exchange. In the present example, this computing device is smart card 201 which is activated by local terminal 210 when smart card 201 is inserted or placed near a smart card reader included in local terminal 210. In various embodiments, smart card 201 may include conductive terminals and/or support a wireless connectivity protocol such that placing smart card 201 in or near the smart card reader activates a processing circuit within smart card 201, initiating execution of application 205. Application 205 may, in some embodiments, be stored in smart card 201 (e.g., in flash or other form of non-volatile memory). In other embodiments, some or all of application 205 may be sent from local terminal 210 to smart card 201 after the activation. The user may use an interface included in local terminal 210 to generate request 215. In other embodiments, the placement of smart card 201 in/near local terminal 210, and the subsequent activation of application 205, may generate request 215.

Local terminal 210 may be a computing device in a kiosk at a place of business or other entity at which a user is physically located. For example, local terminal 210 may be included in a fuel pump at a service station, configured to accept payment for fuel, or local terminal 210 may be included in a television in a hotel room configured to allow a user to access a streaming media service in response to an authentication of smart card 201.

As described above, the requested information exchange may be a request to stream particular media content, purchase goods or services, log into an online account, and the like. In some embodiments, the requested information exchange may include physical access through a secured door, elevator, or other form of conveyance. Accordingly, local terminal 210 may be included in any suitable device capable of providing such services, for example, a media player, a fuel pump, an electric vehicle charger, a computer system, a security lock, etc.

Application 205, via local terminal 210, sends request 215 to processing system 220 to authenticate the information exchange for the requesting user. Request 215 may include details about the information exchange, including identifying information about the requesting user. Processing system 220 receives request 215 from local terminal 210, and may request additional information to perform an authentication of the user and to determine whether to approve the requested information exchange and further generate a request for a cryptographic token. Processing system 220 may then send the request for a cryptographic token to token service provider 245. Such requests may involve communication via one or more networks to associated third parties 280 associated with the user and/or the requested information exchange. For example, in regards to a streaming media request, processing system 220 may be part of a streaming media service and may need to contact an associated third party 280 that determines rights of distribution of a requested piece of media to determine if the user has rights to the particular media. In regards to a purchase, processing system 220 may be an information exchange processing system that enables transfers between two or more associated third parties that are independent financial institutions. In such an example, processing system may verify the user has sufficient resources for completing the information exchange.

After receiving an indication that request 215 was declined (by processing system 220 and/or token service provider 245), application 205 may, as shown, identify one or more of connected applications 230. Applications 230 are connected to corresponding computer services, including at least one of applications 230 being connected to computer service 240. Request 215 may be declined for a number of reasons as previously described. In some embodiments, application 205 may only identify other connected applications if a reason for the declination of request 215 is non-risk related.

As shown, application 205 locates one or more different cryptographic tokens 235 associated with respective ones of connected applications 230. In some embodiments, application 205 locates cryptographic tokens 235 on mobile device 270. In other embodiments, application 205 may communicate with processing system 220, via local terminal 210, and provide details regarding the applications 230, allowing processing system 220 to communicate with the corresponding computer services, including computer service 240, to locate the respective cryptographic tokens 235.

Cryptographic tokens 235 are, as shown, usable by respective ones of applications 230 to authenticate the user to a computer service associated with the respective application 230. For example, application 230a may be a social media application running on mobile device 270 that uses cryptographic token 235a to log the user into a particular account of a social media service corresponding to application 230a. Application 230b may be a navigation application that uses cryptographic token 235b to access prior destinations and/or points of interest for the user. Application 230c may be a messaging application that uses cryptographic token 235c to indicate an identity of the user to other users of a messaging service associated with application 230c. These are merely three examples and, in other embodiments, other types of applications are contemplated.

As illustrated, locating the different cryptographic tokens 235 includes identifying a connected device associated with the user, different from smart card 201. In this example, the different computing device is mobile device 270, upon which applications 230 are executing. Application 205 may, via local terminal 210, communicate with mobile device 270 using a Bluetooth or Wi-Fi connection. In some embodiments, local terminal 210 may communicate with mobile device 270 via the Internet which mobile device 270 may be connected to via a cellular network. Application 205 identifies applications 230 that are connected to respective computer services, including at least one application 230 connected to computer service 240. In response to determining that applications 230 are connected to respective online services, application 205 locates cryptographic tokens 235 associated with applications 230. In some embodiments, mobile device 270 may include an additional application (not shown) that is associated with application 205 and/or processing system 220. The identification of applications 230 and cryptographic tokens 235 may be performed, at least in part, by this additional application.

After cryptographic tokens 235 have been located, Application 205, as shown, sends a subset of cryptographic tokens 235 to processing system 220. In some embodiments, application 205 may send information identifying cryptographic tokens 235 to processing system 220, rather than sending the tokens themselves. Processing system 220 uses information from the tokens, as well as information regarding the computer services with which the respective cryptographic tokens 235 are associated, to select a particular one of cryptographic tokens 235 (e.g., cryptographic token 235b).

Selecting cryptographic token 235b may include various steps. For example, processing system 220 may determine which of cryptographic tokens 235 are usable by for completing the requested information exchange. A first entity that is associated with processing system 220 may have prearranged agreements with particular entities that are associated with particular ones of applications 230. Such arrangements may include allowing the first entity to repurpose particular tokens associated with the particular entities, according to pre-arranged terms and conditions. In addition, one or more of cryptographic tokens 235 may include, within the respective token, a set of conditions for reusing the respective token. Accordingly, processing system 220 may evaluate conditions set by respective issuers (referred to herein as "generators") of cryptographic tokens 235, and then select the particular one of cryptographic tokens 235 using the evaluation. For example, conditions for use may include a fee or surcharge payable by the first entity to the respective second entity if the second entity's token is used by the first entity. Other conditions may include a time frame during which the respective cryptographic token 235 is valid, and an authentication method that was used to authenticate the respective cryptographic token 235.

In a similar manner as described in regards to FIG. 1, processing system 220 creates a request for substitute cryptographic token 236 based on authentication information in cryptographic token 235b, and then sends this request to token service provider 245. In turn, substitute cryptographic token 236 is usable to complete the information exchange. For example, substitute cryptographic token 236 may be sent to one or more of the associated third parties 280, enabling the associated third parties 280 to exchange information related to the exchange.

In some embodiments, local terminal 210 may, in response to the declination of request 215, use mobile device 270 to communicate with processing system 220. For example, if a reason for declining request 215 is related to a poor communications link between local terminal 210 and processing system 220, then local terminal 210 may communicate to mobile device 270 via a local communication link such as Bluetooth or Wi-Fi. Mobile device 270 may then use the active connection of application 230b to communicate with computer service 240. Computer service 240 may then communicate with processing system 220 to complete the information exchange. In some embodiments, computer service 240 that is associated with application 230b may be capable of completing the information exchange without further involvement of processing system 220. Instead, computer service 240 may provide the role of a processing system, and therefore, be responsible for generating the request for substitute cryptographic token 236 and communicating with token service provider 245 to issue substitute cryptographic token 236. Using mobile device 270 and computer service 240 may improve a quality of a communication link that avoids timeouts or other issues that may have prevented local terminal 210 from successfully communicating with processing system 220.

After cryptographic token 235b has been selected, application 205 may cache remaining ones of the subset of cryptographic tokens 235 for consideration for use with a subsequent request. In some embodiments, the cached tokens (e.g., cryptographic tokens 235a and 235c) may be cached in a storage memory included in smart card 201. In other embodiments, application 205 may cause an associated application in mobile device 270 to cache the unused tokens within memory circuits in mobile device 270. In further embodiments, processing system 220 may cache the unused cryptographic tokens 235a and 235c within memory circuits accessible to processing system 220.

It is noted that FIG. 2 is one example of a system that is capable of repurposing an existing cryptographic token to complete an information exchange. In other embodiments, additional elements may be included, such as networking devices to enable communication between processing system 220 and mobile device 270 and/or local terminal 210. Although three applications 230 are shown as being active on mobile device 270, any suitable number of connected applications may be running at a given point in time.

FIG. 3 depicts another example of a system that implements the disclosed cryptographic token repurposing techniques. System 300 includes local terminal 310, processing system 320 mobile device 301, second device 370, computer service 340, token service provider 345, and associated third parties 380. Application 305 is running on mobile device 301, while applications 330a-330c (collectively applications 330) are running on second device 370. In FIG. 2, an example of an application running on a smart card was described as receiving a request for an information exchange. In the example of FIG. 3, an information exchange request received by an application running on a mobile device is disclosed.

As illustrated, mobile device 301 may correspond to any suitable computing device capable of communicating with other computing devices and of performing operations associated with application 305, such as a smart phone, tablet computer, smart watch or other type of wearable smart device, and the like. Application 305, running on mobile device 301, receives an indication that a user is requesting to perform an information exchange. Application 305 may receive the indication via user input on an interface of mobile device 301, from local terminal 310 via a point-to-point communication link, e.g., Bluetooth, near-field communication (NFC), etc., or from an online service via a cellular or Wi-Fi network. The requested information exchange may be any suitable type of information exchange as previously described.

Application 305, as shown, generates request 315 in response to the indication. Generation of request 315 may include gathering information regarding the identity of the user, as well as at least some details of the requested information exchange. Application 305 may then send request 315 to processing system 320, request 315 to be authorized by processing system 320. In response to receiving request 315 from mobile device 301, processing system 320 is configured to generate a first token request to issue a cryptographic token. The first token request is sent to token service provider 345, where the requested cryptographic token is to be authorized and issued back to processing system 320. In some embodiments, processing system 320 and token service provider 345 may be the same entity, while in other embodiments, token service provider 345 is a different entity offering a service to generate secure cryptographic tokens to subscribers.

As disclosed above, request 315 and/or the first token request may be declined for a number of reasons. Some of these reasons may be linked to risk concerns (e.g., previous failures by the user to fulfill terms of previous information exchanges), while other reasons may be linked to non-risk concerns (for example, expiration of a time limit for communicating between mobile device 301 and processing system 320).

In response to determining that authorization of request 315 and/or the first token request failed, processing system 320 sends an indication of the failed authorization to mobile device 301. In response to the indication of the authorization failure, mobile device 301 identifies one or more different cryptographic tokens 335 associated with respective connected applications 330 associated with the user. As described above, ones of the different cryptographic tokens 335 are usable by applications 330 to authenticate the user to respective computer services, including at least one application 330 associated with computer service 340.

In the present embodiment, mobile device 301 identifies cryptographic tokens 335 by first identifying second device 370, a connected device associated with the user and different from mobile device 301. Connected applications 330 are executed by second device 370. For example, if the user is refueling or charging a vehicle, the vehicle itself may have smart connectivity capabilities and, therefore, may be second device 370. In other cases, a laptop computer or tablet computer may be active in the vehicle and may function as second device 370. In some embodiments, mobile device 301 may be a smart watch or other wearable device, and a smart phone may correspond to second device 370.

In various embodiments, mobile device 301, local terminal 310, or processing system 320 may identify second device 370. For example, in response to rejecting request 315, processing system 320 may identify second device 370 using a user profile associated with the user that indicates that second device 370 is an authorized device of the user that may be used for completing particular types of information exchanges associated with processing system 320. In such cases, processing system 320 may determine that second device 370 is located in proximity to mobile device 301 based on location information from each device and/or a determination that mobile device 301 and second device 370 are connected to a same network access point, or are connected to each other (e.g., a Bluetooth connection).

After second device 370 has been identified, application 305 selects a subset of cryptographic tokens 335a-335c (collectively cryptographic tokens 335) that are associated with respective connected applications 330 running on second device 370. As illustrated, application 305 then sends the subset of cryptographic tokens 335 to processing system 320. Processing system 320 may then select a particular cryptographic token from the subset of cryptographic tokens 335. In a manner as previously described, cryptographic tokens 335 are usable by a respective connected application 330 to authenticate the user to a computer service associated with the respective connected application 330. Accordingly, cryptographic tokens 335 may not have been issued for completing an information exchange of the type of information exchange associated with request 315.

Processing system 320 selects one of cryptographic tokens 335 (e.g., cryptographic token 335c) using a technique as described above. In some cases, processing system 320 may base the selection on pre-existing agreements with computer services associated with corresponding ones of cryptographic tokens 335. Instead, or in addition, cryptographic tokens 335 may include one or more conditions for use of the respective token by processing system 320. Furthermore, processing system 320 may communicate with respective computer services, including computer service 340 which is associated with cryptographic token 335c, to determine conditions for using the respective ones of the subset of cryptographic tokens. Processing system 320 selects cryptographic token 335c based on pre-existing agreements and/or included conditions.

In other embodiments, application 305 on mobile device 301 may generate, using authentication information from selected cryptographic token 335c a further request to authenticate the information exchange. Instead of processing system 320 generating the second token request, the further request from application 305 may include the request for substitute cryptographic token 336, usable to complete the information exchange. Application 305 may then send the further request to processing system 320.

As depicted, processing system 320 generates a second token request to issue substitute cryptographic token 336 using information from cryptographic token 335c. This second token request is sent to token service provider 345 which, in turn, issues substitute cryptographic token 336. Using substitute cryptographic token 336, processing system 320) completes the requested information exchange. For example, substitute cryptographic token 336 may be sent to one or more of associated third parties 380 to enable an information exchange between the third parties, and/or between a given third party 380 and the user.

In some embodiments, rather than processing system 320 generating and sending the second token request to token service provider 345, computer service 340, as part of the conditions for use of cryptographic token 335c, instead performs some or all of the tasks related to the issuing of substitute cryptographic token 336. Computer service 340 may also be used in addition to, or in place of, processing system 320 to complete the information exchange, thus potentially avoiding communication issues that may have contributed to the rejection of the original request 315.

FIG. 2 depicts an example in which an information exchange request is received by a smart card activated by a local terminal and is completed after identifying a mobile device, and FIG. 3 depicts an example in which an information exchange request is received by a mobile device and is completed after identifying a second device of a user. FIG. 4, described below, illustrates an example in which a mobile device includes both an application that receives an information exchange request and a different application using a valid cryptographic token.

Proceeding to FIG. 4, a third example of a system that implements the disclosed cryptographic token repurposing techniques is depicted. System 400 includes local terminal 410, processing system 420, mobile device 401, computer service 440, token service provider 445, and associated third parties 480. Application 405 is running on mobile device 401, as are applications 430a-430c (collectively applications 430). In FIG. 2, an example of an application running on a smart card is described as receiving an indication of a request for an information exchange. In the example of FIG. 3, an application running on a mobile device receiving an indication of an information exchange request is disclosed, in which a cryptographic token is identified on a second device. In the example of FIG. 4, an indication of an information exchange request is received by an application running on a mobile device, and a cryptographic token is identified for a different application on the same mobile device.

In a similar manner as described above for mobile device 301, mobile device 401 via application 405, receives an indication from a user of a request to perform an information exchange. As disclosed above, the requested information exchange may be any suitable type of information exchange. Application 405 generates and sends, to processing system 420, request 415 to authenticate the requested information exchange. In response to request 415, processing system 420 may generate and send a first request for a cryptographic token to token service provider 445. In other embodiments, processing system 420 may decline request 415 without generating the first token request. Due to one or more reasons as have been described, processing system 420 declines authorization of request 415 and sends an indication that request 415 is declined to application 405.

After receiving the indication that request 415 was declined, application 405 looks for different cryptographic tokens that are valid and that may provide authentication of the user. Application 405 identifies applications 430, running on mobile device 401, connected to respective online services. As described previously, application 405 may identify applications 430 after determining that there are no risk-related reasons for the rejection of request 415. Otherwise, if a risk-related reason is indicated for the rejection, then application 405 may indicate to the user that the information exchange request has been rejected and cease further operations related to request 415. In such a case, the user may request a new information exchange.

After applications 430 have been identified, application 405 may locate one or more valid cryptographic tokens 435a-435d (collectively 435) associated with applications 430. Cryptographic tokens 435 are usable by respective connected applications 430 to authenticate the user to computer services, including computer service 440, associated with respective applications 430. In some embodiments, application 405 may be limited to locating cryptographic tokens that are issued by second entities with which a first entity related to application 405 has an active agreement. Such an agreement may allow the first entity to reuse an authentication of cryptographic tokens of the second entities to authorize a user for information exchanges related to the first entity. This agreement may further include particular conditions for the use of the second entity's token, including conditions that may be included in cryptographic tokens 435.

Application 405 selects a subset of cryptographic tokens 435, and sends the subset to processing system 420. Processing system 420 may then select a particular one of the subset of cryptographic tokens 435 (e.g., 435a). In other embodiments, application 405 may select the particular cryptographic token 435a and generate, using authentication information from cryptographic token 435a, a further request to authenticate the information exchange, and send the further request to processing system 420. In some embodiments, this further request includes a request for substitute cryptographic token 436 to be issued and usable to complete the information exchange.

Cryptographic token 435a may be selected based on, for example, a preferred set of conditions associated with cryptographic token 435a as compared to conditions associated with cryptographic tokens 435b and 435c. For example, conditions for using cryptographic token 435a may include a settlement fee for the generator of cryptographic token 435a that is less than similar fees for using cryptographic tokens 435b and 435c. Other conditions that may influence selection of cryptographic token 435a may include an amount of time for which cryptographic token 435a will remain valid, a time period for settling conditions of the requested information exchange, a method used to authenticate the user, and the like.

As illustrated, after cryptographic token 435a of the subset of cryptographic tokens 435 has been selected, application 405 caches remaining ones of the subset (e.g., cryptographic token 435b and/435c) for consideration for use with a subsequent request. In other embodiments, the remaining cryptographic tokens 435 may be cached, instead or additionally, by processing system 420. If a subsequent request for an information exchange is also declined (e.g., for a non-risk reason) then a cached token may be used to complete the information exchange rather than identifying other applications with other valid cryptographic tokens.

It is noted that the examples of FIGS. 2-4 are presented to demonstrate various embodiments of the disclosed concepts. The disclosed examples are not intended to be limiting, and, examples of additional embodiments may include different elements. For example, the disclosed embodiments include identifying three other applications. This number is used for clarity in the figures, and in other embodiments, any suitable number of other applications may be identified. In addition, a single cryptographic token is shown for each of the other applications. In some embodiments, a different number of tokens may be associated with various ones of the other applications.

FIGS. 1-4 describe use of cryptographic tokens. Cryptographic tokens may be implemented in various manners. An example of cryptographic tokens that may be used in conjunction with the disclosed techniques is depicted in FIG. 5.

Figure 5:
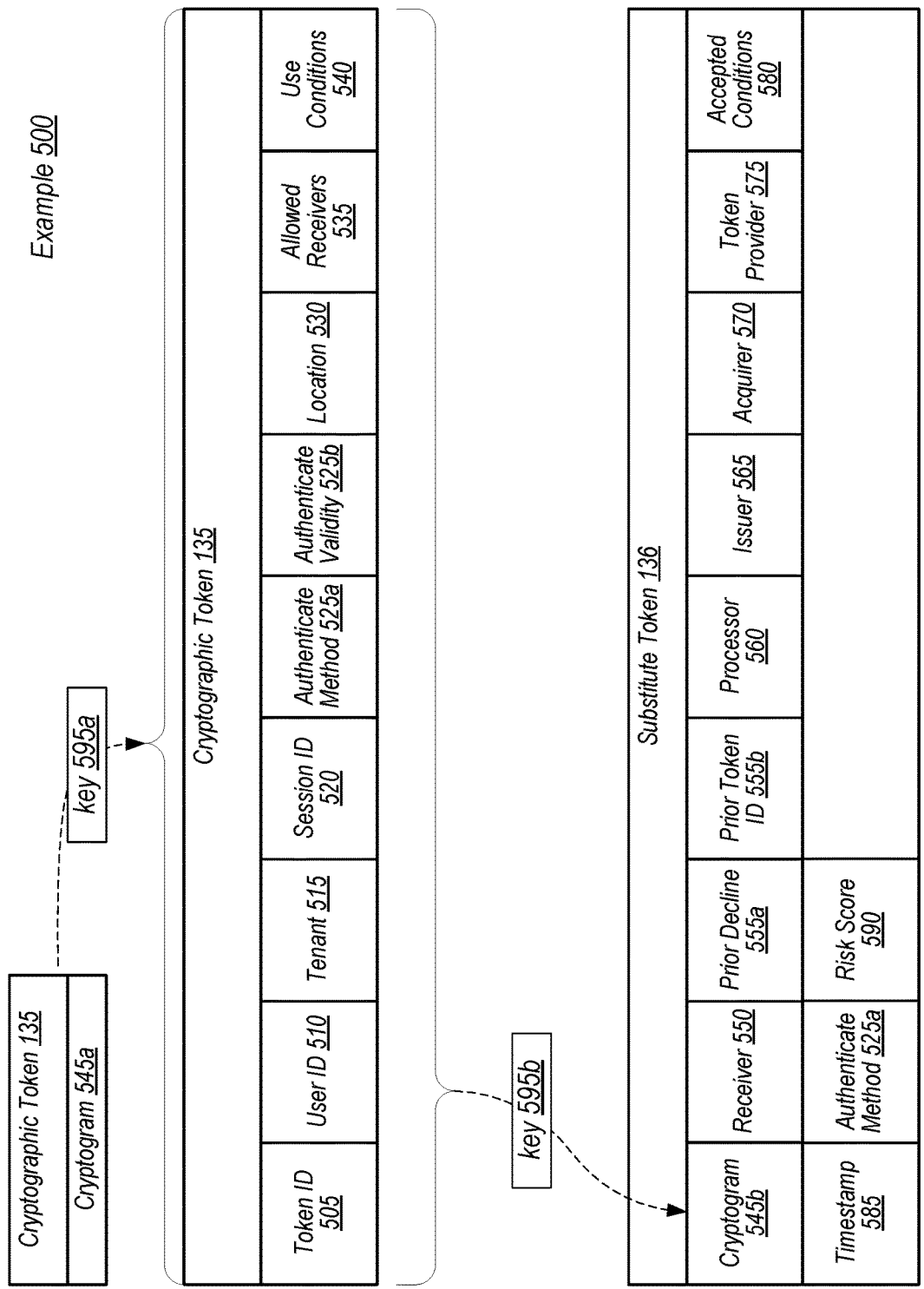
FIG. 5 shows an example of a cryptographic token and a substitute cryptographic token.

Moving now to FIG. 5, examples of a cryptographic token and a substitute cryptographic token are illustrated. Example 500 includes cryptographic token 135 and substitute cryptographic token 136 from system 100 of FIG. 1. Cryptographic token 135, as previously disclosed, is associated with application 130 and may be used to authenticate user 160 with an online service associated with application 130. Cryptographic token 135 includes cryptogram 545a which, in turn, includes encrypted values for a plurality of elements associated with user 160 and the user's use of application 130. Substitute cryptographic token 136 is associated with application 105 and similarly includes values for a plurality of elements associated with user 160 and the user's use of application 105.

As disclosed above, cryptographic token 135 is identified and selected to be used for generating substitute cryptographic token 136 after application 105 determines that request 115 is declined. To generate substitute cryptographic token 136, processing system 120 (and/or application 105) decrypts, using key 595a, cryptogram 545a from cryptographic token 135. Information included in cryptogram 545a includes token identification (ID) 505, user identification (ID) 510, tenant 515, session identification (ID) 520, authentication method 525a, authentication validity 525b, location 530, allowed receivers 535, and use conditions 540.

As illustrated, token ID 505 is a value that uniquely identifies cryptographic token 135 from other tokens that may be in active use, e.g., a value that is unique from other token IDs that are currently in use. User ID 510 provides an indication of user 160. Such an indication may not include any personal information regarding user 160, such as the user's name, but may be used to differentiate user 160 from other users accessing the same or similar online services. Tenant 515 provides an indication of an entity for which cryptographic token was issued. For example, a second entity that is associated with application 130 may use an independent generator to generate cryptographic tokens. This generator may generate tokens for a plurality of tenants and, therefore, include an identifier for the particular tenant for which cryptographic token 135 is issued. Session ID 520 provides an identifying value for a particular session during which cryptographic token 135 is valid. A session may be related to a most recent time when user 160 logged into the corresponding online service using application 130. A particular session may be active from a point at which user 160 successfully logs into the online service until user 160 logs out.

Authentication method 525a indicates a particular method used to authenticate user 160 when user 160 logs into the online service via application 130. In some cases, authentication method 525a may indicate a single method, such as verification of user credentials. In other cases, two or more methods may be included, such as, in addition to credentials, use of a one-time-use code, a finger print, facial recognition, responses to one or more security questions, and the like. Authentication validity 525b may indicate an amount of time for which the one or more authentication methods are valid. Location 530 may provide global positioning coordinates, a physical address, and/or other indication of a physical location of user 160 at a time when cryptographic token 135 is issued. Allowed receivers 535 provides an indication of one or more entities for which cryptographic token 135 may be used to generate substitute cryptographic token 136. The generator of cryptographic token 135 may place limitations on other entities that may be associated with substitute cryptographic token 136. For example, the generator may not want cryptographic token 135 associated with media streaming, but may allow cryptographic token 135 to be associated with purchases at certain merchants. The allowed merchants may then be identified via allowed receivers 535. Use conditions 540, as described previously, may include one or more conditions for the use of cryptographic token 135 to generate substitute cryptographic token 136. Such conditions may include a variety of terms, such as fees associated with the use of cryptographic token 135, times of day and/or days of the week during which cryptographic token 135 is allowed to be used for generating substitute cryptographic token 136, time limits for which the generated substitute cryptographic token may be valid, a timeframe for the generator to fulfill their end of the requested information exchange, and other similar conditions. For example, if cryptographic token 135 is to be associated with a purchase, then one use condition 540 may include a number of days before the generator provides funds to the merchant that receives the funds.

When application 105 determines that request 115 has been declined, a plurality of other applications 130 may be identified and, in turn, a plurality of cryptographic tokens 135 identified. Accordingly, processing system 120 (and/or application 105) may decrypt, using key 595a, some or all of the identified cryptographic tokens 135. After using key 595a to decrypt cryptogram 545a, processing system 120 extracts at least one of use conditions 540 from a corresponding one of cryptographic tokens 135. Processing system 120 may then compare the extracted use conditions 540 that are set by respective generators of the different cryptographic tokens 135. Processing system 120 selects a particular cryptographic token 135 based on the comparison of the respective use conditions.

To create a request for substitute cryptographic token 136, processing system 120 may encrypt, using key 595b, the information extracted from cryptographic token 135 within the request substitute cryptographic token 136, such as illustrated by cryptogram 545b. After receiving the request, token service provider 145 may then generate substitute cryptographic token 136 with the extracted information, encoded by key 595b. Cryptogram 545b may include some or all of the information from cryptographic token 135. In some embodiments, key 595b may be the same as key 595a that was used to decrypt cryptogram 545a. In other embodiments, cryptographic tokens may be encoded and decoded using asymmetric keys in which, for example, key 595a is a public key used by multiple different applications to decode cryptograms and key 595b is a private key known to application 105 to encode cryptograms included in generated tokens. Creating substitute cryptographic token 136 may further include denoting authentication method 525a within substitute cryptographic token 136. In addition, generating substitute cryptographic token 136 may include denoting the accepted conditions 580 from use conditions 540 in the selected cryptographic token 135.

Other elements included in substitute cryptographic token 136 may include receiver 550 that indicates with which one of allowed receivers 535 substitute cryptographic token 136 is associated. Prior decline 555a indicates whether substitute cryptographic token 136 is generated in response to a rejection of a prior token. For example, in the original cryptographic token included in request 115, prior decline 555a may indicate that no request related to the token was declined. For substitute cryptographic token 136, prior decline 555a indicates that a previous token had been submitted for the requested information exchange and was declined. Prior token ID 555b provides an identifier for the previously submitted and rejected token.

As illustrated, processor 560, generator 565, acquirer 570, and token provider 575 each provide identifiers for different entities involved with the requested information exchange. Processor 560 provides an indication of which entity or entities are responsible for enabling the requested information exchange, including authenticating user 160. Accordingly, processor 560 may include an entity associated with processing system 120 that originally rejected the authentication of request 115, as well as an entity associated with computer service 140, whose cryptographic token 135 is being used to authenticate user 160 and enable the requested information exchange to complete. Generator 565 and acquirer 570 correspond to two entities involved with the requested information exchange itself. for example, if the requested information exchange is a purchase, then generator 565 may be a financial institution used by the buyer that is providing funds, and the acquirer 570 may be a financial institution used by the merchant to receive the funds. If the information exchange is related to media streaming, then the issue may be an entity that has distribution rights to a piece of media being requested, while acquirer 570 is an entity associated with a streaming service used by user 160 to receive the media stream. Token provider 575 may indicate an entity that issued the original cryptographic token in request 115.

Additional elements of substitute cryptographic token 136 may include timestamp 585 and risk score 590. Timestamp 585 may indicate when substitute cryptographic token 136 is generated. In other embodiments, timestamp 585 may indicate when cryptographic token 135 was created and/or approved, or timestamp 585 may include any combination of these points in time. Risk score 590 indicates a relative risk of the requested information exchange failing to be fulfilled by user 160. For example, risk score 590 may be a value from 1 to 10 (or any other suitable range of values) in which '1' represents highest confidence that user 160 will complete the requested information exchange while '10' represents lowest confidence that user 160 will complete the requested information exchange. In such embodiments, a risk score 590 that is above a particular threshold value (e.g., '5') may result in one or more entities associated with the requested information exchange rejecting the information exchange.

It is noted that example 500 merely demonstrates token reuse based on the disclosed techniques, and is not intended to be limiting. In various embodiments, cryptographic token 135 and/or substitute cryptographic token 136 may include a different combination of elements from the illustrated embodiment.

Figure 6:
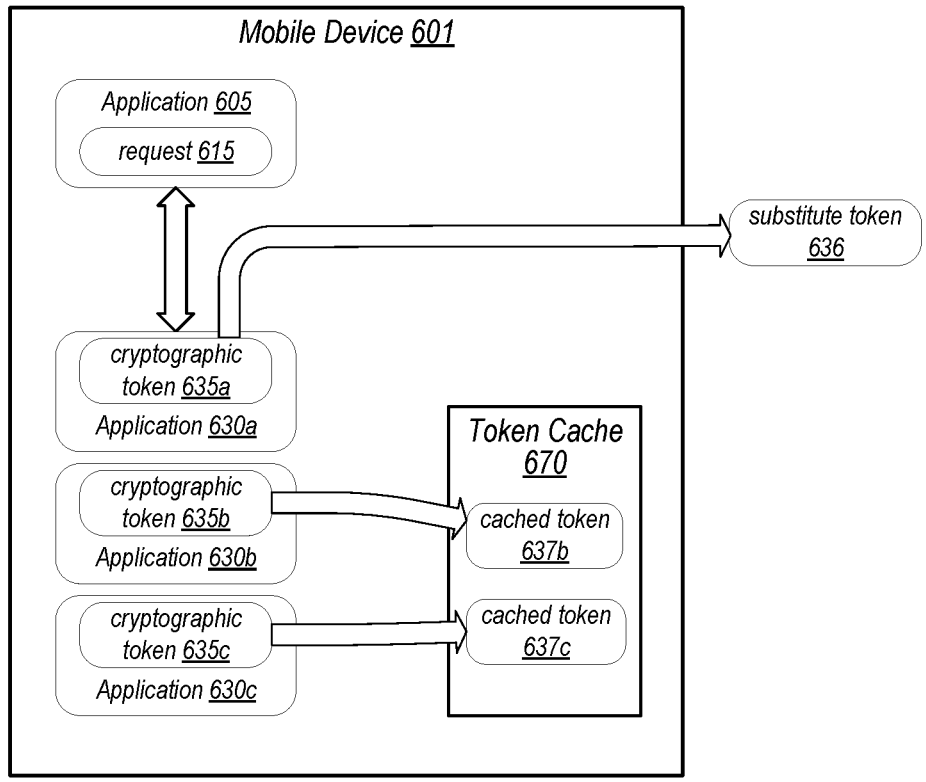
FIG. 6 depicts a block diagram of an embodiment of a mobile device used to authorize a request.

Turning now to FIG. 6, a block diagram of an embodiment of a mobile device that uses cryptographic tokens is depicted. As shown, mobile device 601 includes token cache 670. Mobile device 601 is configured to perform operations included in application 605, as well as applications 630a-630c (collectively 630). Applications 630 include respective ones of cryptographic tokens 635a-635c (collectively 635). In various embodiments, mobile device 601 may correspond to computing device 101 in FIG. 1, or any of mobile devices 270, 301, or 401 in FIGS. 2-4, respectively.

In a manner as disclosed above, application 605 may identify applications 630, and the corresponding cryptographic tokens 635, in response to a rejection of request 615. Application 605 may identify applications 630 either within mobile device 601, as shown, or on a second device as shown in FIG. 3. To select one of the identified cryptographic tokens 635, mobile device 601 (or a processing system such as processing system 120, 220, 320, or 420) evaluates conditions (e.g., use conditions 540 in FIG. 5) set by respective generators of cryptographic tokens 635, selects, for example, cryptographic token 635a using the evaluation. Cryptographic tokens 635b and 635c may, however, remain valid for use for future information exchange requests.

Accordingly, application 605 may further cache, in token cache 670 of mobile device 601, a subset of unselected ones of cryptographic tokens 635 (e.g., 635b and 635c) for consideration for use with a subsequent request. As shown, cached tokens 637b and 637c are stored in token cache 670 after cryptographic token 635a is selected to generate substitute cryptographic token 636. Token cache 670 may be implemented using any suitable type of memory circuits, such as static or dynamic random-access memories (SRAM and DRAM, respectively), or non-volatile memory such as flash. Cached tokens 637b and 637c may include a portion of elements of substitute cryptographic token 136 as depicted in FIG. 5. Elements that are not specific to a particular information exchange request may be included in cached tokens 637b and 637c, such as cryptogram 545, accepted conditions 580, authenticate method 525a and the like. In other embodiments, elements of cached tokens 637b and 637c may be limited to the elements in cryptographic tokens 635b and 635c.

If application 605 receives a subsequent information exchange request, application 605, as illustrated, determines if token cache 670 includes at least one currently valid cached token 637. If, for example, cached token 637b is still valid at the time the subsequent request is received, then application 605 uses cached token 637b to generate a respective substitute cryptographic token. Otherwise, application 605 identifies applications 630 in response to determining that no valid cached tokens 637 are currently available in token cache 670.

It is noted that the example of FIG. 6 is merely for demonstrative purposes. Only elements necessary for describing the disclosed concepts are illustrated. Although not shown, mobile device 601 may further include one or more processors, one or more memory circuits for executing applications 605 and 630, storage memory circuits for long-term storage of applications 605 and 630, as well as various networking circuits and other circuits for implementing typical features of various mobile devices.

Figure 7:
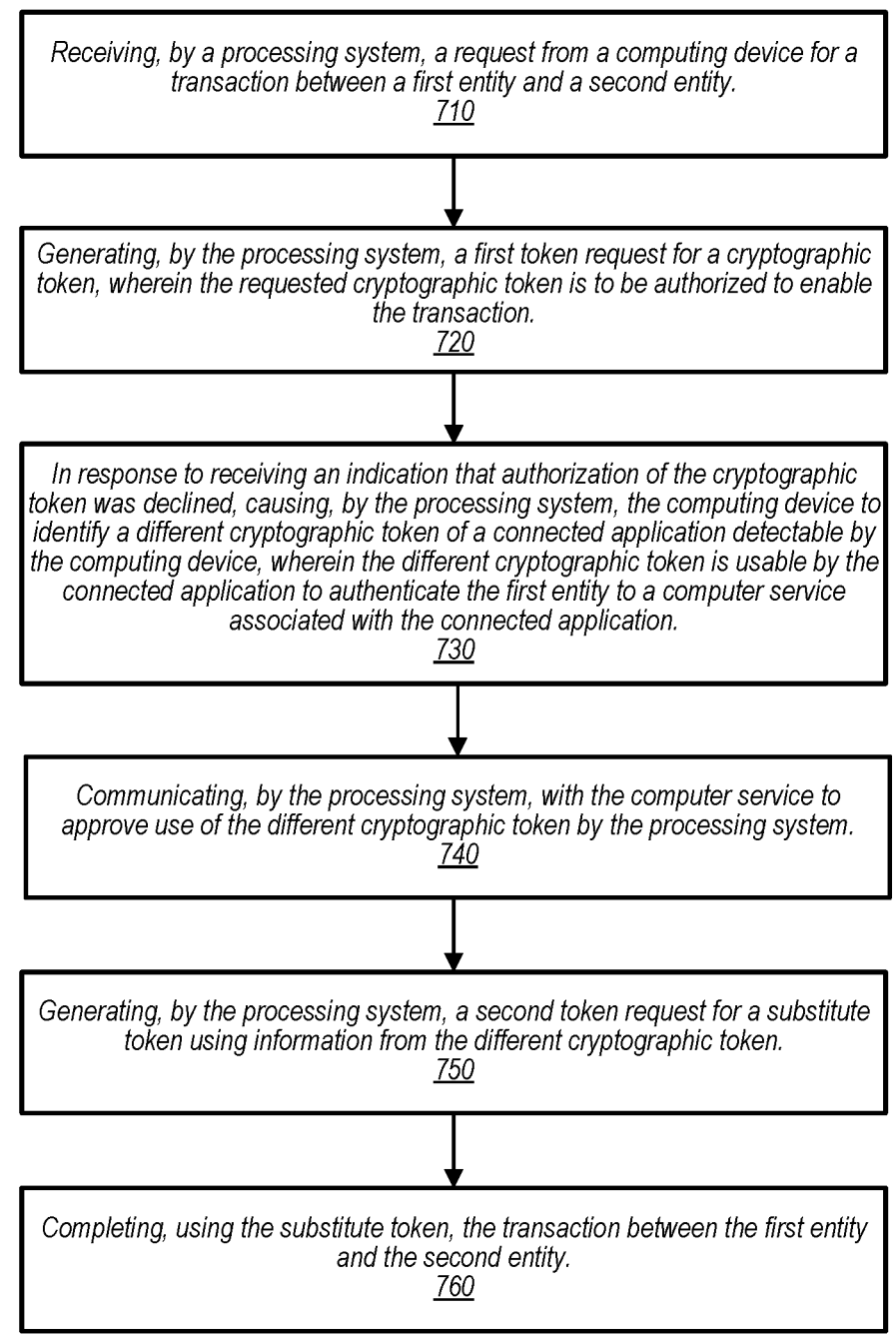
FIG. 7 illustrates a flow diagram of an embodiment of a method for authorizing a request for an information exchange.
Figure 8:
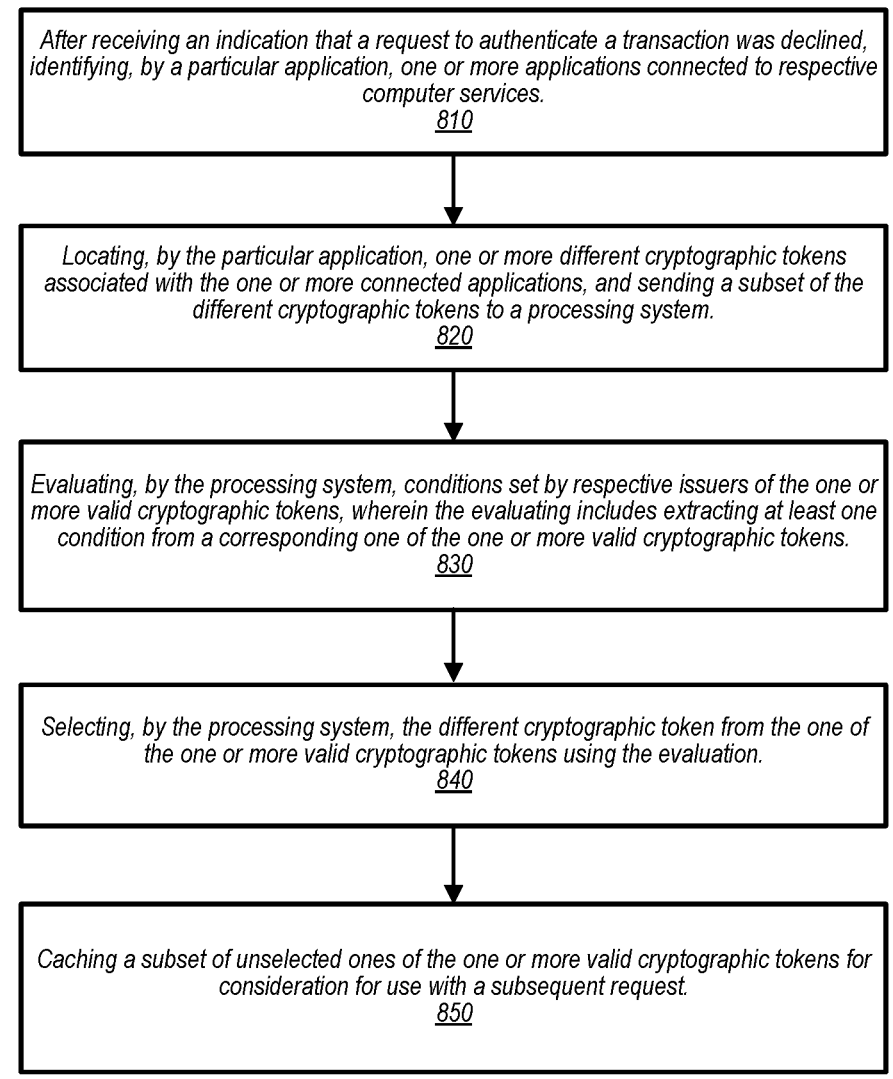
FIG. 8 shows a flow diagram of an embodiment of a method for identifying valid cryptographic tokens associated with connected applications.

FIGS. 1-6 describe various techniques for identifying and reusing cryptographic tokens to complete an information exchange request. Such techniques may be implemented using a variety of methods. FIGS. 7-8 describe two such methods.

Proceeding now to FIG. 7, a flow diagram of an embodiment of a method for reusing, by an application, a cryptographic token, from a different application, for completing an information exchange is depicted. In various embodiments, method 700 may be performed by a processing system such as processing systems 120, 220, 320, and 420 in FIGS. 1-4, respectively, to identify and use a cryptographic token to generate a substitute cryptographic token. For example, processing system 120 may include (or have access to) a non-transitory, computer-readable medium having program instructions stored thereon that are executable by the processing system to cause the operations described with reference to FIG. 7. Referring collectively to FIGS. 1 and 7, method 700 begins in block 710.

At block 710, method 700 includes receiving, by processing system 120, request 115 from computing device 101 for an information exchange between user 160 and a second entity. As described above, the information exchange may, for example, be a request to stream particular media content, purchase goods or services, log into an online account, unlock a door or other secured portal, and the like. In various embodiments, user 160 may directly interface with application 105 to generate request 115 or may indicate a request for an information exchange that causes application 105 to generate request 115 and then send request 115 to processing system 120.

Method 700 further includes generating, at block 720 by processing system 120, token request 117 for a cryptographic token. As illustrated, the requested cryptographic token is to be authorized, by token service provider 145, to enable the information exchange. Authorizing token request 117 may include communication between processing system 120 and computing device 101 as well as between processing system 120 and token service provider 145. In some cases, an identity of user 160 cannot be confirmed due to a determination that there is a greater than threshold level of probability that user 160 is not who they claim to be (e.g., possible identity theft), while in other cases, the identity of user 160 cannot be confirmed due to issues with communication between processing system 120 and computing device 101 or token service provider 145. The former case may be considered a risk-based criterion for declining token request 117, while the latter case may be considered a non-risk criterion. In the present example, token request 117 is declined for the latter case, based on a non-risk criterion.

Method 700 at block 730 also includes, in response to receiving an indication that token request 117 was declined, causing, by processing system 120, computing device 101 to identify cryptographic token 135 of connected application 130 detectable by computing device 101. As illustrated, cryptographic token 135 is usable by application 130 to authenticate user 160 to computer service 140 that is associated with application 130. For example, application 130 may be a messaging application identifies user 160 uniquely from other users of computer service 140. In some embodiments, identifying cryptographic token 135 includes identifying application 130 running on computing device 101, same as application 105. In other embodiments, a second device associated with user 160, different from computing device 101, is identified. In such cases, connected application 130 may be executed by the second device. For example, application 130 may be a different application that is executed independently from application 105 on computing device 101. In other embodiments, application 130 may be executing on a different device than computing device 101. For example, computing device 101 may be a mobile phone and the second device is a tablet computer, laptop computer, an automobile with internet connected features, and the like. In such embodiments, computing device 101 may communicate with the second device via a wireless network such as Wi-Fi or Bluetooth.

Block 740 of method 700 includes communicating, by processing system 120, with computer service 140 to approve use of cryptographic token 135 by processing system 120. In some embodiments, processing system 120 has access to predefined terms for using a given cryptographic token belonging to computer service 140. In other cases, cryptographic token 135 itself may include terms for repurposing the token. Processing system 120 may communicate with computer service 140 to finalize an approval for processing system 120 to use cryptographic token 135 to generate substitute cryptographic token 136.

At block 750, method 700 further includes generating, by processing system 120, substitute cryptographic token request 137 using information from cryptographic token 135. As shown, generating substitute cryptographic token request 137 includes decrypting at least a portion of information included in cryptographic token 135. As described above in regards to FIG. 5, cryptographic token 135 may include one or more encrypted values that include indications of the identity of user 160 and may further include indications of how the identity was authenticated. At least some of the decrypted information from cryptographic token 135 is included in substitute cryptographic token request 137, including indications of the identity of user 160. Such included information may further be included in substitute cryptographic token 136 that is generated by token service provider 145 after receiving substitute cryptographic token request 137. Token service provider 145 sends the generated substitute cryptographic token 136 to processing system 120.

Method 700 at block 760, further includes completing, using substitute cryptographic token 136, the information exchange between user 160 and the second entity. Substitute cryptographic token 136 may, as illustrated, be usable by processing system 120 to communicate with computer service 140 to authenticate user 160 in order to complete the requested information exchange. In some embodiments, method 700 may include completing the information exchange via computer service 140. For example, computer service 140 may assume the role of a processing system from processing system 120 in order to complete the information exchange.

It is noted that the method of FIG. 7 includes elements 710-760. Method 700 may end in block 760 or may repeat some or all of blocks 710-760. For example, if substitute cryptographic token request 137 is also declined by token service provider 145, then blocks 730-750 may be repeated to identify a different cryptographic token and generate a second substitute cryptographic token. In some cases, method 700 may be performed concurrently with other instantiations of the method. For example, two or more cores, or process threads in a single core, in computing device 101 may each perform method 700 independently from one another.

Moving to FIG. 8, a flow diagram of an embodiment of a method for identifying a plurality of cryptographic tokens, selecting one for generating a substitute cryptographic token and caching at least one of the unselected identified tokens is depicted. Portions of method 800 may be performed by a computing device such as computing device 101 in FIG. 1, smart card 201 in FIG. 2, or mobile devices in FIGS. 3 and 4. Other portions may be performed by a processing system such as any of those shown in FIGS. 1-4. The computing device may, for example, include (or have access to) a non-transitory, computer-readable medium having program instructions stored thereon (e.g., applications 105, 205, 305, or 405) that are executable by the computing device to cause at least some of the operations described with reference to FIG. 8. In some embodiments, method 800 may correspond to one or more actions that occur as a part of blocks 730-750 in method 700. Referring collectively to FIGS. 3 and 8, method 800 begins in block 810 with application 305 having sent request 315 to processing system 320 for authenticating a user.

Block 810 of method 800 includes, after receiving an indication that request 315 was declined, identifying, by application 305 running in mobile device 301, applications 330 connected to respective computer services. As previously described, application 305 may identify applications 330 in response to determining that request 315 was declined due to a non-risk based criterion. Applications 330 may be any suitable application running, as shown, on second device 370 and connected to a respective computer service (e.g., computer service 340) in which a corresponding cryptographic token 335 may be used to authorize the respective connection. In other embodiments, such as shown in FIG. 4, the connected applications 330 may be executed on mobile device 301 along with application 305.

At block 820, method 800 includes locating, by application 305, cryptographic tokens 335 associated with applications 330. After applications 330 have been identified, application 305 identifies respective cryptographic tokens 335 that, as illustrated, are used to identify a user of second device 370 to the respective computer services. Second device 370 is associated with the same user as mobile device 301. Accordingly, cryptographic tokens 335 are usable to authenticate the user on second device 370, and therefore may be usable to authenticate the user on mobile device 301. Application 305 may select all or a portion of cryptographic tokens 335, for example, based on determining respective generators of each token, and then send, to processing system 320, the selected subset of cryptographic tokens 335 for evaluation.

Method 800 also includes, at block 830, evaluating, by processing system 320, conditions set by the respective generators of cryptographic tokens 335. As illustrated, evaluating cryptographic tokens 335 may include extracting at least one condition from a corresponding one of cryptographic tokens 335. As previously described, cryptographic tokens 335 may include information related to authenticating an identity of the user. In addition, some or all of cryptographic tokens 335 may further include one or more respective conditions for using the corresponding cryptographic token 335 to authorize a substitute cryptographic token. Processing system 320 may, therefore, extract the one or more use conditions from ones of cryptographic tokens 335 and compare the use conditions, as well as other relevant information that may be used to determine which one of cryptographic tokens 335 would be preferable to use for generating a substitute cryptographic token.

In addition, method 800 includes at block 840, selecting, by processing system 320, cryptographic token 335a from cryptographic tokens 335 using the evaluation. Based on, for example, the comparison of use conditions, valid timeframes of each cryptographic token 335, and other extracted information, processing system 320 selects cryptographic token 335a for further use. A substitute cryptographic token request may be generated, e.g., as described for block 750 of method 700, to generate substitute cryptographic token 336 and then use substitute cryptographic token 336 to complete the requested information exchange.

Method 800 further includes, at block 850, caching a subset of unselected ones of cryptographic tokens 335 for consideration for use with a subsequent request. The unused ones of cryptographic tokens may be cached by application 305 in mobile device 301, by a different application in second device 370, and/or by processing system 320. For example, application 305 may determine that cryptographic tokens 335b and/or 335c are suitable for use with a potential information exchange request that may be received at a subsequent time. To determine suitability, application 305 may detect that one or both of cryptographic tokens 335b and 335c remains valid for a suitable amount of additional time, such as another five minutes, thirty minutes, one or more hours, and the like. Application 305 may be configured to set a particular threshold amount of valid time as desired by an entity that maintains application 305. If a subsequent information exchange request is received, application 305 may determine if a valid cached token is available before performing the operations of blocks 810 and 820.

It is noted that the method of FIG. 8 includes elements 810-850. Method 800 may end in block 850, or may be repeated in response to an indication that a different request has been declined and that no valid tokens have been cached. In a similar manner as method 700, different instances of method 800 may be performed by one or more processor cores in the mobile device to process multiple requested information exchanges concurrently. Method 800 may be performed concurrently with method 700 and/or as a portion of method 700, such as block 730.

Figure 9:
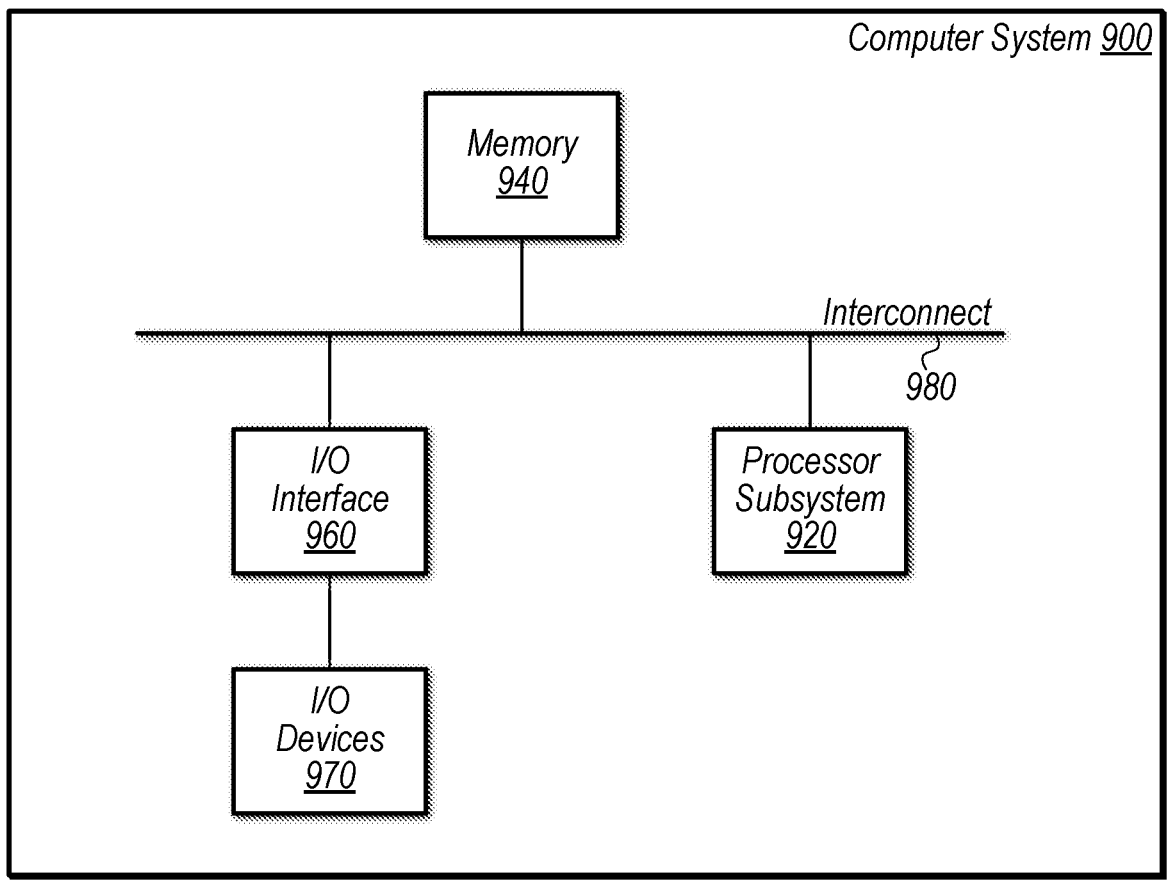
FIG. 9 is a block diagram illustrating an example computer system, according to some embodiments.

In the descriptions of FIGS. 1-8, various computing devices, mobile devices, second devices, processing systems, computer services and the like have been disclosed. Such devices may be implemented in a variety of manners. FIG. 9 provides an example of a computer system that may correspond to one or more of the disclosed devices.

Referring now to FIG. 9, a block diagram of an example computer system 900 is depicted. Computer system 900 may, in various embodiments, implement one or more of the disclosed computer systems/services/devices, such as computing device 101, processing system 120, computer service 140, and token service provider 145 in FIG. 1, as well as the various mobile devices, smart cards, local terminals, processing systems, computer services, and second devices in FIGS. 2-6. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein, including, for example, operations of applications 105, 205, 305, 405, 605, 130, 230, 330, 430, and 630. System memory 940 may be implemented using different physical, non-transitory, computer-readable media, such as hard disk storage, floppy disk storage, removable disk storage, flash memory, random access memory (RAM—SRAM, EDO RAM, SDRAM, DDR SDRAM, LPDDR SDRAM, etc.), read-only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over Wi-Fi®, Bluetooth®, Ethernet, etc.), and computer system 900 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method comprising:
receiving, by a processing system from a first application on a computing device of a first entity, a request for an information exchange between the first entity and a second entity;
generating, by the processing system, a first token request for a cryptographic token, wherein the requested cryptographic token is to be authorized to enable the information exchange;
in response to receiving an indication that authorization of the cryptographic token was declined, causing, by the processing system, the first application on the computing device of the first entity to identify a different cryptographic token of a connected application, different from the first application and detectable by the computing device, wherein the different cryptographic token is usable by the connected application to authenticate the first entity to a computer service associated with the connected application;
communicating, by the processing system, with the computer service to approve use of the different cryptographic token by the processing system;
generating, by the processing system, a second token request for a substitute cryptographic token using information from the different cryptographic token; and
completing, using the substitute cryptographic token, the information exchange between the first entity and the second entity.

2. The method of claim 1, wherein receiving the request from the computing device for the information exchange includes receiving the request via a local terminal communicating with the computing device; and
wherein completing the information exchange using the substitute cryptographic token includes sending the substitute cryptographic token via the computer service, omitting the local terminal.

3. The method of claim 1, wherein the indication that the request was declined includes an indication that a reason for declining is related to a non-risk criterion.

4. The method of claim 3, further comprising declining, by the processing system, the authorization of the cryptographic token in response to determining that a time limit for receiving a response from a different computer system was exceeded.

5. The method of claim 1, wherein identifying the different cryptographic token includes:
identifying one or more connected applications, associated with the first entity, that are connected to respective computer services that are not associated with the information exchange;
locating one or more valid cryptographic tokens associated with the one or more connected applications; and
selecting the different cryptographic token from the one or more valid cryptographic tokens.

6. The method of claim 5, wherein selecting the different cryptographic token includes:
evaluating conditions set by respective generators of the one or more valid cryptographic tokens; and
selecting the different cryptographic token using the evaluation.

7. The method of claim 6, wherein the evaluating includes extracting at least one condition from a corresponding one of the one or more valid cryptographic tokens.

8. The method of claim 5, further comprising caching, by the processing system, a subset of unselected ones of the one or more valid cryptographic tokens for consideration for use with a subsequent request.

9. The method of claim 8, wherein identifying the one or more connected applications is performed in response to determining that no valid cryptographic tokens are currently cached.

10. The method of claim 1, wherein identifying the different cryptographic token includes identifying a connected device associated with the first entity, different from the computing device, wherein the connected application is executed by the connected device.

11. A non-transitory computer-readable medium having instructions stored thereon that are executable by a computer system to perform operations of a first application comprising:
in response to an indication from a first entity, sending, to a processing system, a request to authenticate an information exchange;
after receiving an indication that the request to authenticate was declined, identifying one or more connected applications, wherein a given connected application has been connected, by the first entity, to a respective computer service;
locating one or more different cryptographic tokens associated with respective ones of the connected applications, wherein the different cryptographic tokens are usable by the respective connected applications to authenticate the first entity to computer services associated with the respective connected applications, and wherein the respective connected applications are different from the first application and are not associated with the information exchange;

sending, to the processing system, a subset of the one or more different cryptographic tokens; and after a particular cryptographic token of the subset of different cryptographic tokens has been selected, caching remaining ones of the subset for consideration for use with a subsequent request.

12. The non-transitory computer-readable medium of claim 11, further comprising:

generating, using authentication information from the particular cryptographic token, a further request to authenticate the information exchange; and sending, to the processing system, the further request, wherein the further request includes a request for a substitute cryptographic token that is usable to complete the information exchange.

13. The non-transitory computer-readable medium of claim 11, wherein the identifying is performed in response to determining that a reason for declining the request to authenticate was related to one or more non-risk criteria.

14. The non-transitory computer-readable medium of claim 11, wherein the respective connected applications are running on the computer system.

15. The non-transitory computer-readable medium of claim 11, wherein identifying the one or more different cryptographic tokens includes identifying a different device associated with the first entity, wherein the respective connected applications are running on the different device.

16. A system comprising:

a mobile device configured to, in response to an indication from a first entity via a first application executing on the mobile device, send a request to perform an information exchange;

a processing system configured to:

in response to receiving the request from the mobile device, generate a first token request to issue a cryptographic token, wherein the requested cryptographic token is to be authorized;

in response to determining that authorization of the requested cryptographic token failed, send an indication of the failed authorization to the mobile device;

wherein the mobile device is further configured to:

identify one or more different cryptographic tokens associated with respective connected applications that are different from the first application and are associated with the first entity, wherein ones of the different cryptographic tokens are usable by the respective connected applications to authenticate the first entity to respective computer services but are not usable for completing the requested information exchange; and send a subset of the different cryptographic tokens to the processing system;

wherein the processing system is further configured to:

select a particular cryptographic token from the subset of the different cryptographic tokens;

generate a second token request to issue a substitute cryptographic token using information from the particular cryptographic token; and use the substitute cryptographic token to complete the requested information exchange.

17. The system of claim 16, wherein the processing system is further configured to send the generated first and second requests to a token service provider.

18. The system of claim 17, wherein the token service provider and the processing system are a same entity.

19. The system of claim 16, wherein to select the particular cryptographic token, the processing system is further configured to:

extract respective use conditions from the one or more different cryptographic tokens; and select the particular cryptographic token based on a comparison of the respective use conditions.

20. The system of claim 19, wherein to generate the second token request to issue the substitute cryptographic token, the processing system is further configured to denote the respective use conditions included in the particular cryptographic token.

* * * * *